United States Patent

Kobayashi et al.

Patent Number: 5,307,408
Date of Patent: Apr. 26, 1994

[54] HANDSET SUPPORTING DEVICE

[75] Inventors: Tuyoshi Kobayashi; Fumio Hashimoto, both of Machida, Japan

[73] Assignee: Matsushita Electric Industrial Co., Ltd., Osaka, Japan

[21] Appl. No.: 960,569

[22] Filed: Oct. 13, 1992

Related U.S. Application Data

[63] Continuation of Ser. No. 749,104, Aug. 23, 1991, abandoned.

[30] Foreign Application Priority Data

Sep. 28, 1990 [JP] Japan ................................ 2-260987

[51] Int. Cl.⁵ .............................................. H04M 1/00
[52] U.S. Cl. ........................................ 379/435; 379/433
[58] Field of Search ............... 379/435, 436, 449, 455, 379/426, 61, 433

[56] References Cited

U.S. PATENT DOCUMENTS

| | | | |
|---|---|---|---|
| 4,107,481 | 8/1978 | Redshaw | 379/435 |
| 4,609,785 | 9/1986 | Drinkard et al. | 379/449 |
| 4,706,274 | 11/1987 | Baker et al. | 379/160 |
| 4,710,596 | 12/1987 | Kurokawa | 379/435 |
| 4,937,859 | 6/1990 | Osterloh | 379/435 |

FOREIGN PATENT DOCUMENTS

| | | |
|---|---|---|
| 61-151452 | 9/1986 | Japan . |
| 63-113352 | 7/1988 | Japan . |
| 1-107232 | 7/1989 | Japan . |

Primary Examiner—James L. Dwyer
Assistant Examiner—Jack Chiang
Attorney, Agent, or Firm—Stevens, Davis, Miller & Mosher

[57] ABSTRACT

A telephone handset support device includes a resting base having a receiver setting recess and a receiver engaging projection formed on an inner side surface of the receiver setting recess. When a receiver is set in the recess, the projection engages with an engagement recess formed in the receiver. The handset resting base is provided with a spring which applies an urging force in the direction of releasing the engagement between the engagement recess of the handset and the receiver engaging projection and which also functions as charging terminals. The spring functions, when the support device is used for a desk-top type telephone, to release the engagement between the engagement recess and the receiver engaging projection and, when the support device is used for a wall-hang type telephone, to enable engagement between the engagement recess and the receiver engaging projection due to the weight of the handset itself against the urging force.

3 Claims, 5 Drawing Sheets

HANDSET SUPPORTING DEVICE

This application is a continuation of application Ser. No. 07/749,104, filed Aug. 23, 1991 (abandoned).

BACKGROUND OF THE INVENTION

This invention relates to a telephone handset supporting device telephones used both for desk-top type and wall-hang type telephones.

In general, in case a handset supporting device of a telephone is to be used both for desk-top type and wall-hang type telephones, a projection piece 18 (see FIGS. 8 and 9) for engagement with a receiver is detachably attached to an inner side surface of a receiver setting recess 17 formed in a handset resting base 16 so that the projection piece 18 can be used selectively for, desk-top type and wall-hang type telephones by being attached selectively in reversed orientations. More specifically, when the telephone is to be used as a desk-top type telephone, the projection piece 18 is attached with its attaching direction being fixed so as to be prevented from being projected beyond the inner side surface of the recess 17 as shown in FIG. 9 so that, even when the handset 19 is set in the recess 17, the projection piece 18 can be prevented from being engaged with an engagement recess 20 of the handset 19. On the other hand, when the telephone is to be used as a wall-hang type telephone, the projection piece 18 is attached with its attaching direction being reversed so as to be projected beyond the inner side surface of the recess 17 as shown in FIG. 8, and therefore, in case of setting the handset 19 in the recess 17, the projection piece 18 is made to be engaged with the engagement recess 20 of the handset 19 so as to prevent the handset 19 from falling off.

However, in this kind of device, since the receiver engaging projection piece 18 formed separately is detachably attached, in case of changing over from the desk-top type to the wall-hang type, and vice versa, it is necessary each time to attach the projection piece 18 after turning the telephone upside down. This changeover operation is very troublesome and sometimes causes loss of the projection piece 18.

SUMMARY OF THE INVENTION

The present invention aims to eliminate the above-described disadvantages of the prior art, and an object of the invention is to provide an excellent telephone handset supporting device which is simple in construction and capable of being used easily both for desk-top type and wall-hang type telephones without providing any separate receiver engaging projection piece.

To this end, the present invention is constructed such that a receiver engaging projection is formed on an inner side surface of a receiver setting recess so as to be made to engage, when a receiver is set in the recess, with an engagement recess formed in the receiver, and a handset resting base is provided with means for applying an urging force in the direction of releasing the engagement between the engagement recess of the handset resting on the base and the receiver engaging projection so that the means for applying the urging force serves, when used as a desk-top type telephone, to release the engagement between the engagement recess and the receiver engaging projection and, when used as a wall-hang type telephone, to make the engagement between the engagement recess and the receiver engaging projection due to the weight of the handset itself against the urging force.

Therefore, according to the present invention, the engagement between the engagement recess and the receiver engaging projection can be automatically selected to be made or released merely by shifting the orientation of the handset resting base for desk-top type or wall-hang type purposes. In consequence, it is not necessary at all, unlike the prior art, to form the separate receiver engaging projection piece as well as to attach it after turning the telephone upside down during each changeover, and furthermore, changeover between the desk-top type and the wall-hang type use can be made without difficulty.

DESCRIPTION OF THE PREFERRED EMBODIMENTS

Figure 1:
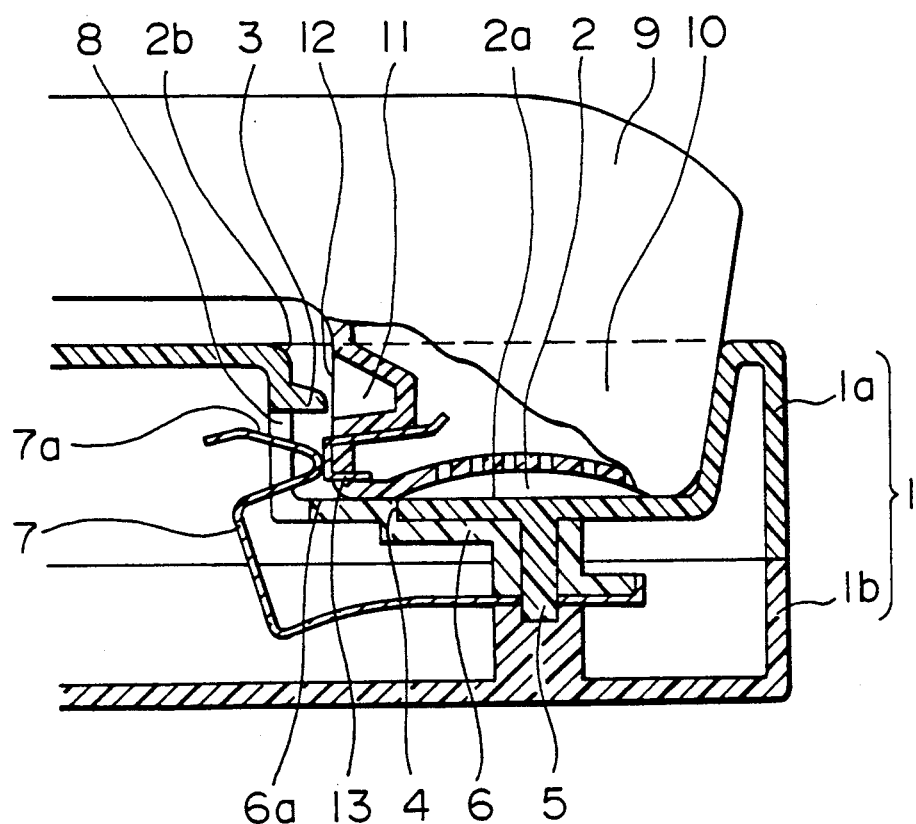
FIG. 1 is a sectional side view of a telephone handset supporting device according to a first embodiment of the present invention.

FIGS. 1 to 5 show the structure of a telephone handset supporting device according to an embodiment of the present invention. Reference numeral 1 denotes a handset resting base consisting of an upper case 1a and a lower case 1b which are to be fitted and fixed to each other, 2 denotes a receiver setting recess formed in a portion of the upper case 1a of the base 1, 3 denotes a receiver engaging projection formed integral with a side plate 2b of the recess 2 such as to be projected from the inner side surface of the recesses 2, 4 denotes a space formed in the recess 2 while extending partially over a bottom plate 2a and the side plate 2b, 5 denotes a boss formed integral with the bottom plate 2a at the center of the rear face thereof, 6 denotes a leaf spring mounting sub-base plate having one end thereof fitted on the boss and the other end thereof fixed to the rear face of the upper case 1a of the base 1, 7 denotes leaf springs serving also as charging terminals each of which has one end thereof fixed to the rear face of the sub-base plate 6 and the other end thereof projected inwardly of the recess 2 through a through hole 8 formed between the sub-base plate 6 and upper case 1a, 9 denotes a handset to be reset on the base 1, 10 denotes a receiver section of the handset 9, 11 denotes an engagement recess portion formed in the outer periphery of the receiver section 10, 2 denotes a plane portion formed in the outer periphery of the receiver section 10, and 13 denotes charging terminals attached to the plane portion 12.

The sub-base plate 6 has a portion 6a the shape of which agrees with the shape of the space 4, and the portion 6a serves to form parts of the bottom plate and side plate of the receiver setting recess 2. Further, each of the leaf springs 7 is formed in the shape of letter L so that a portion thereof projected inwardly of i the recess 2 through the through hole 8 has a surface 7a inclined with respect to the bottom plate of the recess 2.

Figure 2:
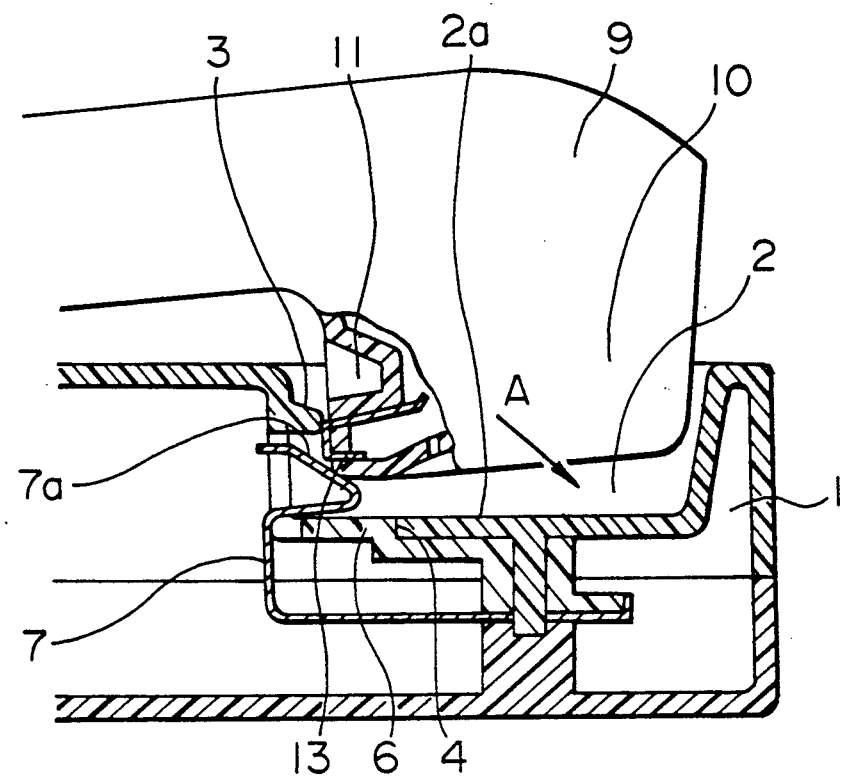
FIGS. 2 to 5 are views for explanation of the operation of the same embodiment.
Figure 3:
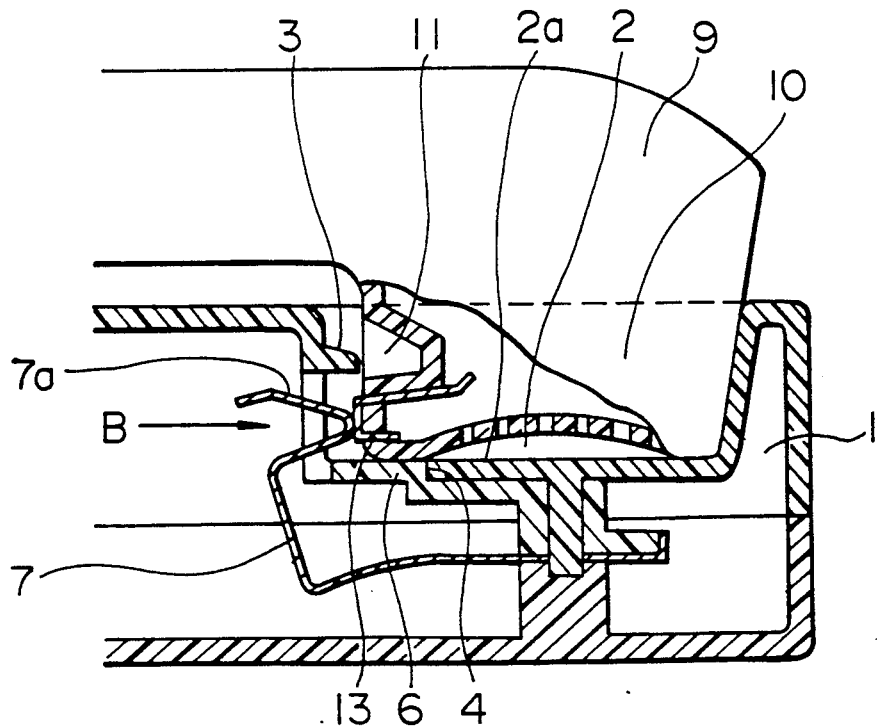

Description will now be given of the above-described embodiment when used for the desk-top type telephone. In this case, the base 1 is to be located horizontally and the handset 9 is to be rested thereon. As the handset 9 is rested on the base 1, the outer periphery of the receiver section 10 of the handset 9 is first made to come in contact with the inclined surface a of each of the leaf springs 7 as shown in FIG. 2 and then moved along the inclined surface 7a in the direction of arrow A. In this way, the receiver section 10 is moved until it comes in contact with the bottom plate 2a of the receiver setting recess 2 as shown in FIG. 3. In this case, the leaf springs 7 are slightly moved downwards to recede due to the weight of the handset 9 itself. Before the receiver section 10 comes in contact with the bottom plate 2a of the receiver setting recess 2, the leaf springs 7 are made to come in contact with the charging terminals 13 attached to the outer periphery of the receiver section 10 so as to press the receiver 10 section 10 in the direction of arrow B as shown in FIG. 3. In consequence, the outer peripheral portion of the receiver section 10 is made to come in contact with the inner peripheral surface of the receiver setting recess 2 on the side opposite to the position where the leaf springs 7 are attached so that the engagement recess portion 11 formed in the outer peripheral portion of the receiver section 10 is prevented from being engaged with the engaging projection 3 formed in the receiver setting recess 2. In this state, the charging terminals 13 and the leaf springs 7 can be kept in contact with each other sufficiently. For this reason, it is possible to pick up the handset 9 easily in this state, thus achieving the function of the supporting device for the desk-top type telephone satisfactorily.

Figure 4:
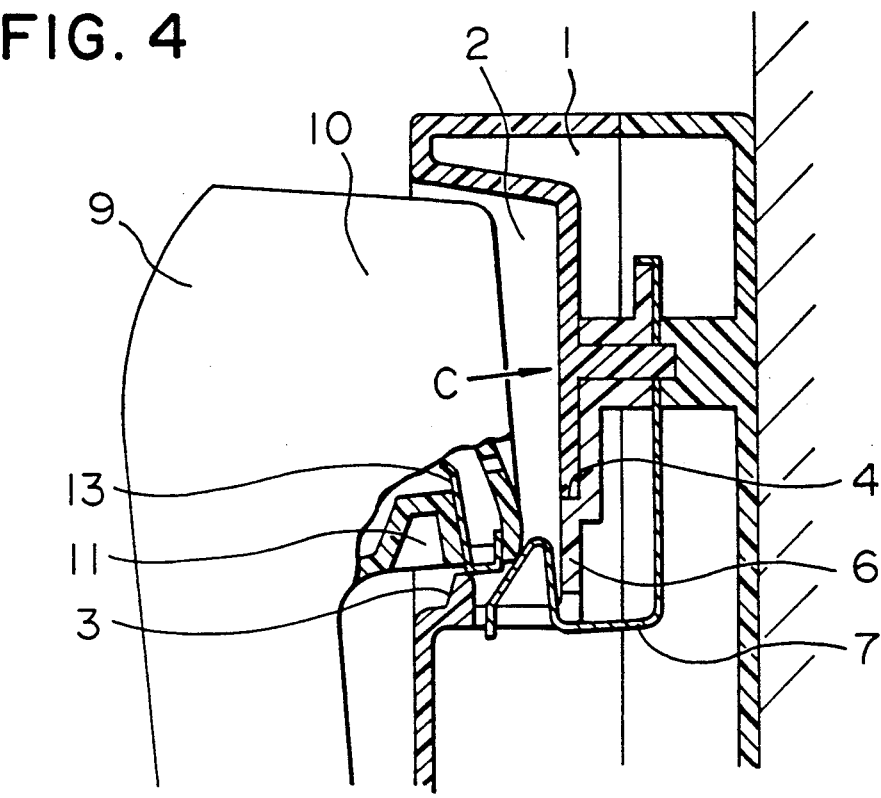
Figure 5:
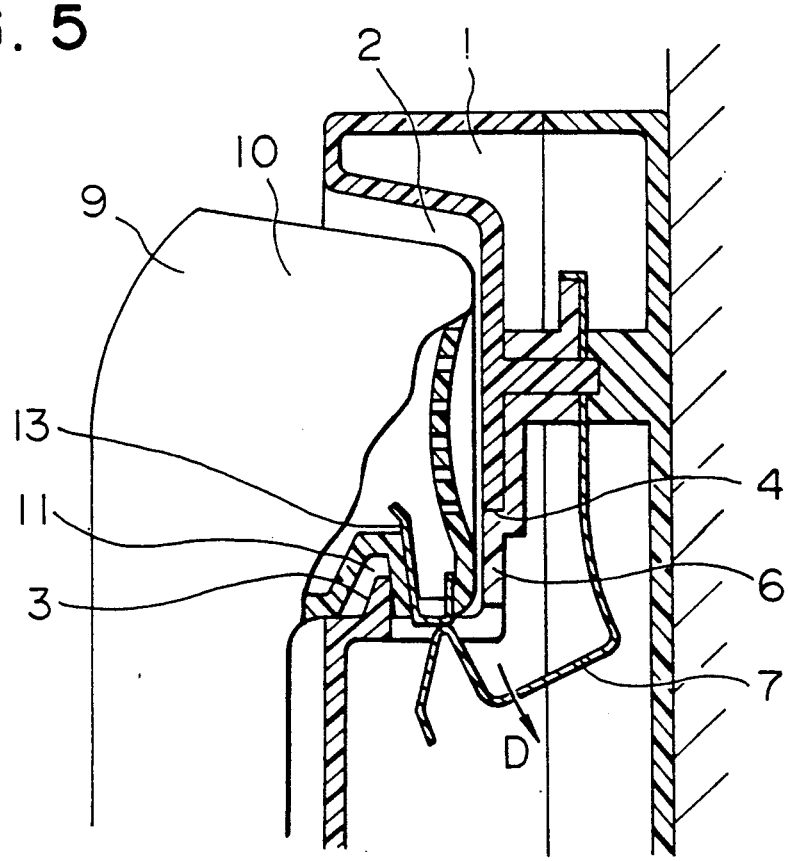

Next, description will be given of the supporting device when used for the wall-hang type telephone. In this case, the base 1 is to be located vertically or nearly vertically and the handset 9 is to be rested thereon as shown in FIGS. 4 and 5. In this case, therefore, only by inserting the receiver section 10 into the receiver setting recess 2 formed in the base 1 from the direction of arrow C as shown in FIG. 4 and then releasing it in this state, the overall weight of the handset 9 itself is applied to the leaf springs 7 to make the leaf springs 7 curve in the direction of arrow D so that the engagement recess portion 11 formed in the outer periphery of the receiver section 10 is engaged with the receiver engaging projection 3 formed in the receiver setting recess 2. In consequence, the handset 9 can be rested stably in this state and, furthermore, the charging terminals 13 and the leaf springs 7 can be kept in contact with each other sufficiently.

When it is intended to pick up the handset 9 from the base 1, it is possible to pick up the handset 9 easily only by lifting slightly the handset 9 to release the engagement between the engagement recess portion 11 and receiver engaging projection 3 and then drawing, in this state, the receiver section 10 out of the receiver setting recess 2.

As described above, according to the present embodiment, it is possible to set and rest the handset on the base with ease and with accuracy in both cases of use for the desk-top type and the wall-hang type without attaching separately any detachable projection piece for engagement with the receiver. Further, in case of changing over from the desk-top type to the wall-hang type, and vice versa, no special operation is not required and the changeover operation can be performed very easily.

Moreover, according to the above embodiment, the space 4 is formed in a portion of the receiver setting recess 2, and the space 4 is covered with the sub-base plate 6 formed separately so as to serve to partially form the bottom and side plates of the receiver setting recess 2. Therefore, even in case of forming the receiver engaging projection 3 at a position on the inner side surface of the receiver setting recess 2, the receiver engaging projection 3 can be formed easily with solid dies separable in the vertical direction by making use of the space 4. Further, the leaf springs 7 serving also as charging terminals on the base 1 side are designed to be fixed to the sub-base plate 6 formed separately, and therefore, assembly of the base 1 side can be performed in such a manner that the leaf springs 7 serving also as charging terminals are first mounted to the sub-base plate 6 and, then, the sub-base plate 6 is fixed to the bottom plate 2a of the receiver setting recess 2. In consequence, the leaf springs 7 serving also as charging terminals can be mounted very easily and there is no possibility that the leaf springs 7 themselves should be distorted by mistake when they are being mounted.

Figure 6:
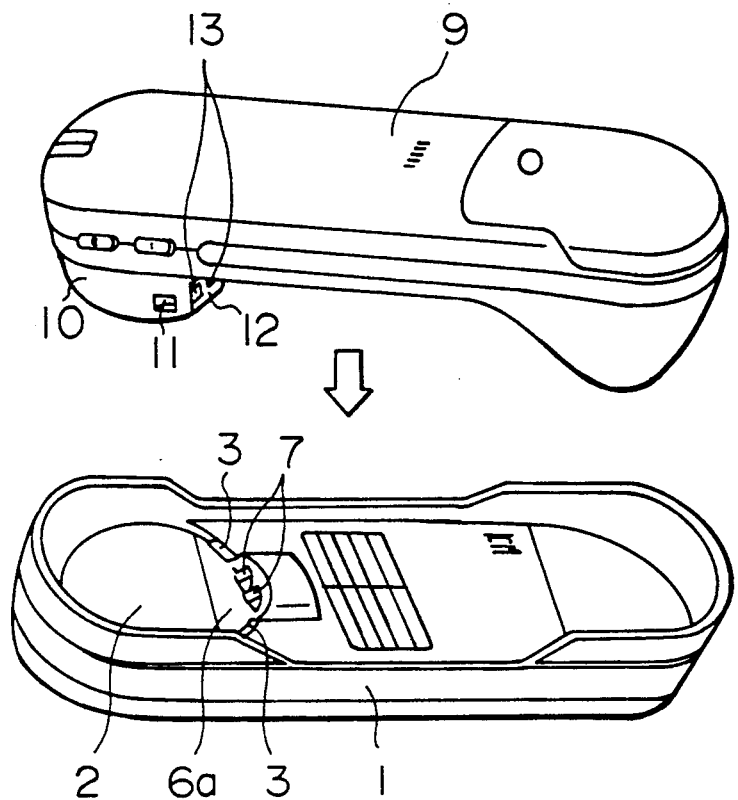
FIG. 6 is a perspective view of a second embodiment.
Figure 7:
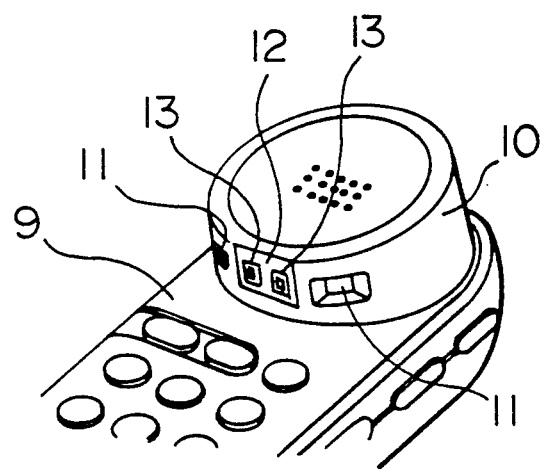
FIG. 7 is a perspective view of the same embodiment, showing essential portions thereof.
Figure 8:
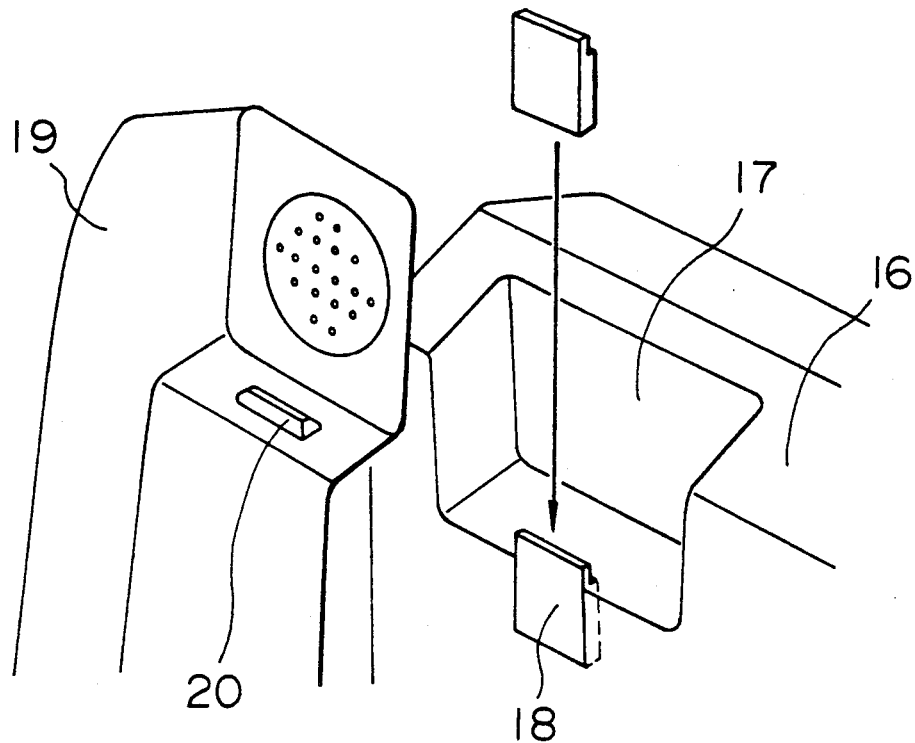
FIG. 8 is a perspective view of a conventional handset supporting device, showing essential portions thereof.
Figure 9:
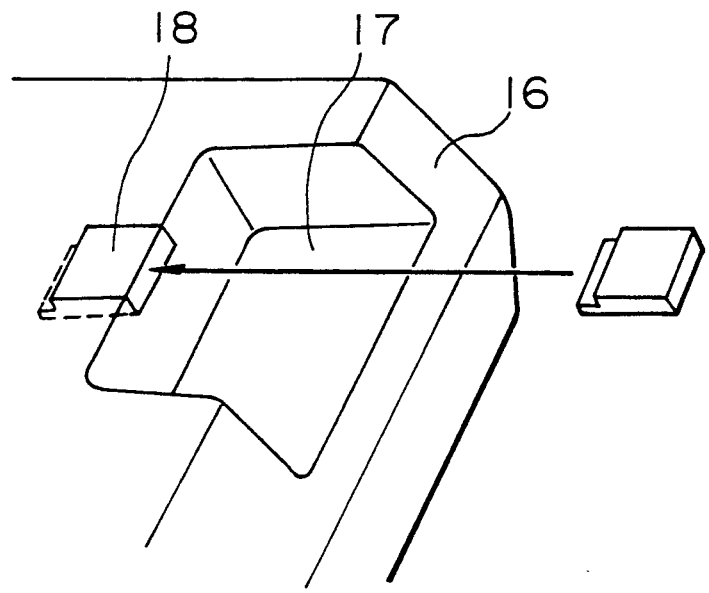
FIG. 9 is a view for explanation of the operation of the same conventional device.

Moreover, in the above-described embodiment, the charging terminals 13 and the engagement recess portion 11 are both provided in the plane portion 12 formed in the outer periphery of the receiver section 10. However, as shown in FIGS. 6 and 7, it is also possible that the charging terminals 13 alone are provided in the plane portion 12 and the engagement recess portions 11 are formed on both sides of the plane portion 12. With such arrangement, engagement between the engaging projection 3 and the engagement recess portion 11 is made at two points so that it is possible to expect the effect of much, more stability.

Further, although the above embodiment has been described in connection with the handset supporting device of a cordless telephone, the handset supporting device of an ordinary telephone can be also constructed in the same manner. In this case, however, the charging terminals 13 on the side of the handset 9 can be dispensed with and, in addition, no leaf spring 7 need be used so far as it serves to urge the handset 9 in the direction in which the handset 9 is moved away from the receiver engaging projection 3.

We claim:

1. A telephone handset supporting device, comprising:
a base including a receiver setting recess, a receiver engaging projection integrally formed on an inner side surface of said receiver setting recess for engaging with an engagement recess formed in a receiver section of a handset when said receiver section is inserted into said receiver setting recess and moved in a direction in which said receiver section approaches said projection, and a biasing means for applying a biasing force, when said receiving section is inserted into said receiver setting recess so as to come close to said projection, against said receiver section in a direction so as to move said receiver section away from said projection, said inner side surface of said receiver setting recess having a throughhole, said biasing means being secured relative to said base and having a portion projecting into said receiving setting recess through said throughhole such that said portion of said biasing means is disposed closer than said receiver engaging projection to a bottom surface of said receiver setting recess, whereby when said supporting device is used for a desk-top type horizontal telephone, said receiver section is moved away from said projection due to the urging force of said biasing means so as to prevent said engagement recess formed in said receiver section from engaging with said projection, and, when said supporting device is used for a wall-hang type vertical telephone, said engagement recess formed in said receiver section is made to engage with said projection due to the weight of said handset itself against the urging force of said biasing means, such that no alteration of said biasing means relative to said base is needed when said supporting device is switched between use as a desk-top type horizontal telephone and use as a wall-hang type vertical telephone, wherein said biasing means comprises charging terminals for contacting charging terminals of the handset.

2. A handset supporting device according to claim 1, wherein said base further comprises a space provided in a bottom surface of the receiver setting recess and a sub-base plate formed to engage with said space.

3. A telephone system comprising (a) a handset having a receiver section and (b) a handset supporting device, said receiver section including a planar portion having charging terminals provided therein and a plurality of engagement recesses comprising at least one recess provided on each side of said planar portion, said handset supporting device comprising a base including a receiver setting recess, a plurality of receiver engaging projections integrally formed on an inner side surface of said receiver setting recess for engaging with said engagement recesses when said receiver section is inserted into said receiver setting recess and moved in a direction in which said receiver section approaches said projections, and a biasing means for applying a biasing force, when said receiver section is inserted into said receiver setting recess so as to come close to said projections, against said receiver section in a direction so as to move said receiver section away from said projections, said inner side surface of said receiver setting recess having a throughhole, said biasing means being secured relative to said base and having a portion projecting into said receiving setting recess through said throughhole such that said portion of said biasing means is disposed closer than said receiver engaging projections to a bottom surface of said receiver setting recess, whereby when said supporting device is used for a desk-top type horizontal telephone, said receiver section is moved away from said projections due to the urging force of said biasing means so as to prevent said engagement recesses formed in said receiver section from engaging with aid projections, and, when said supporting device is used for a wall-hang type vertical telephone, said engagement recesses formed in said receiver section are made to engage with said projections due to the weight of said handset itself against the urging force of said biasing means, such that no alteration of said biasing means relative to said base is needed when said supporting device is switched between use as a desk-top type horizontal telephone and use as a wall-hang type vertical telephone, wherein said biasing means comprises charging terminals for contacting charging terminals of the handset.

* * * * *